(12) United States Patent
Chacko et al.

(10) Patent No.: US 8,239,877 B2
(45) Date of Patent: Aug. 7, 2012

(54) PRE-POPULATION OF META DATA CACHE FOR RESOLUTION OF DATA MARSHALING ISSUES

(75) Inventors: Joseph K. Chacko, Hampshire (GB); Erin L. Schnabel, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 969 days.

(21) Appl. No.: 11/845,961

(22) Filed: Aug. 28, 2007

(65) Prior Publication Data

US 2009/0064184 A1 Mar. 5, 2009

(51) Int. Cl.
G06F 3/00 (2006.01)
G06F 9/44 (2006.01)
G06F 9/46 (2006.01)
G06F 13/00 (2006.01)

(52) U.S. Cl. ........ 719/315; 719/311; 719/313; 719/316; 719/321; 719/330; 719/331; 719/332

(58) Field of Classification Search ........................ None
See application file for complete search history.

(56) References Cited

U.S. PATENT DOCUMENTS

| | | | |
|---|---|---|---|
| 5,737,607 A | 4/1998 | Hamilton et al. | 395/701 |
| 5,991,823 A * | 11/1999 | Cavanaugh et al. | 719/330 |
| 6,272,557 B1 | 8/2001 | Lim et al. | 709/315 |
| 6,272,559 B1 * | 8/2001 | Jones et al. | 719/330 |
| 6,907,609 B1 * | 6/2005 | Kukura et al. | 719/316 |
| 7,289,980 B2 * | 10/2007 | Kogut-O'Connell et al. | 1/1 |
| 2002/0069173 A1 * | 6/2002 | Hori | 705/51 |
| 2004/0031037 A1 | 2/2004 | Ikoma et al. | 719/310 |
| 2004/0267742 A1 * | 12/2004 | Polson et al. | 707/5 |
| 2006/0212444 A1 * | 9/2006 | Handman et al. | 707/5 |
| 2006/0265716 A1 | 11/2006 | Claussen et al. | 719/315 |

* cited by examiner

*Primary Examiner* — Andy Ho
*Assistant Examiner* — Craig Dorais
(74) *Attorney, Agent, or Firm* — Steven Chiu, Esq.; Kevin P. Radigan, Esq.; Heslin Rothenberg Farley & Mesiti P.C.

(57) ABSTRACT

In a data processing system, objects (in the object oriented sense of the word) are instantiated through the use of transmitted data which is marshaled and demarshaled through the use of protocols that acquire meta data for the transmitted data through the use of an already existing cache of such meta data which has proper content meeting version requirements as specified by an implementation key associated with the object. This eliminates the need for call back requests that may or may not succeed because of the presence of a firewall in a yet-to-be-established connection. A tool is provided for structuring the data, first on disk and then later in a more readily available portion of an active memory.

20 Claims, 3 Drawing Sheets

PRE-POPULATION OF META DATA CACHE FOR RESOLUTION OF DATA MARSHALING ISSUES

TECHNICAL FIELD

This invention relates in general to improvement in efficiencies for protocols used in marshaling data in a client-server environment in a distributed data processing system. More particularly, the present invention is related to object oriented environments in which versioning or updating issues associated with data marshalling problems are addressed in order to avoid unnecessary client-server data requests. Even more particularly, the present invention is directed to a method and a tool for implementing a method in which relevant data used in the data marshaling process is provided ahead of time to avoid the need for call back requests which may or may not be met due to versioning or updating issues vis-à-vis a firewall, for example.

BACKGROUND OF THE INVENTION

The present invention operates in an object oriented environment. In client-server relations in this environment, defined protocols allow data to be marshaled between the client and the server. This data pertains to "objects" as that term is applied in the software arts. Marshaling of data for transmission to a client refers to manipulation of that data from an object as it exists in memory into a form suitable for transmission under a defined protocol for managing and transmitting object oriented information for software objects. Marshaling of data is also describable as the conversion between representations of data, formats for calling functions, and formats for returning values. However, it is noted that from time to time updates made to the objects being marshaled, or to protocol support, in the client or the server, can cause problems with migration, especially if the updates introduce issues with respect to data marshaling. For example, in one version of an object there may be two expected fields which are combined into a single field in another version of the object. In another example, there may be differences in the order in which numbers in a two-dimensional array are presented, such as by row in one form or by column in another form. Upon an attempt at demarshaling such data, an error is likely to be generated requiring additional communications to resolve it. The present invention seeks to reduce the need for such communication.

One of the more well known marshaling protocols for use in objected oriented technology is the CORBA GIOP protocol. GIOP is an acronym that stands for "General Inter-ORB Protocol." CORBA is an acronym that stands for "Common Object Request Broker Architecture." A central component of this protocol model is the Object Request Broker (ORB) which enables objects to "make and receive responses in a distributed environment." The CORBA protocol is promulgated and controlled by the Object Management Group, Inc. In particular, the CORBA protocol defines a call back mechanism (SendingRuntimeContext) which, when received data cannot be properly demarshaled, allows one side of an established client-server connection to request information about how the data was marshaled. In Java implementations of the ORB, this translates to a Full Value Description (FVD) callback. FVD is a CORBA-specified structure containing attributes that describe a CORBA object: it's operations, supported interfaces, and other attributes affecting its behavior in the CORBA environment. When a FVD callback is made, the ORB caches the result, namely meta-data about the fields used by the remote class to marshal data (meta-data here refers to descriptive information about the information object being marshaled-what fields are or are not present, for example so that the next time similar data is received, a callback is not repeated.

If two-way connections (with requests flowing in both directions on the same connection) are supported, this callback mechanism is sufficient to ensure that both sides can demarshal data from different, but compatible, objects on either end of the communications path. However, when two-way connections are not available or are not supported, separate connections for these callbacks must be established. This can be problematic, especially as callbacks from a server to an arbitrary client may have to pass through a firewall. For the purpose of understanding the advantages of the present invention, a firewall is a mechanism (hardware or software) that prohibits the passage of data that does not meet certain criteria. These criteria cannot always be anticipated in advance. However, there is frequently a firewall between two ORBs. This can prevent the callback from succeeding due to an outright block by the firewall or due to the presentation of insufficient credentials (for example, a client doesn't usually define credentials for inbound connections).

There are two principal ways to avoid making server-to-client callbacks. The first is to insure that all deployed clients are running the same version of code as the server. This may not be feasible depending on the mix of software deployed at the client end of the system. The second is to insure that the server can support all possible versions of the client. This could (and arguably should) be achieved via marshaling and/or demarshaling code within the class itself.

SUMMARY OF THE INVENTION

This invention proposes a mechanism for pre-populating the meta data stored in the FVD cache, such that FVD callbacks are not required. The invention calls for the use of a software tool that captures meta data required for demarshaling, to avoid any issue with carrying back-level (and potentially broken) class versions forward through service refreshes and future product releases. This meta data library is used by the ORB on the server side to avoid any server-to-client callbacks, and could optionally be used on the client side to avoid client-to-server callbacks as well.

Additional features and advantages are realized through the techniques of the present invention. Other embodiments and aspects of the invention are described in detail herein and are considered a part of the claimed invention.

The recitation of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
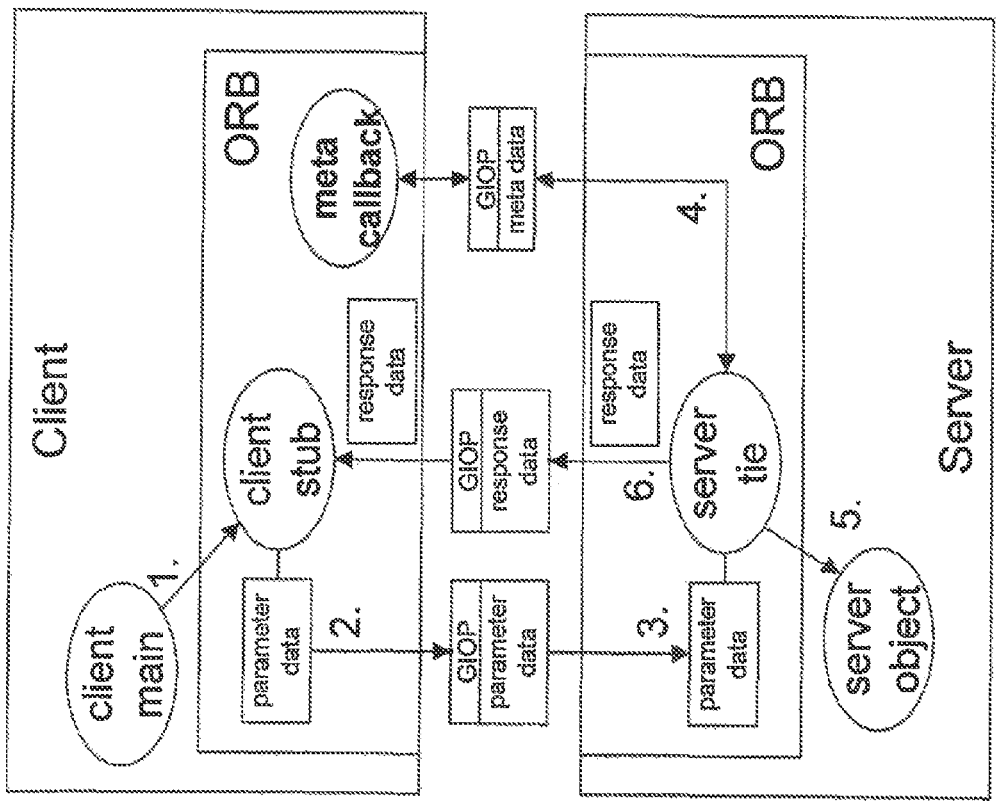
FIG. 1 is a block diagram illustrating the typical approach to the resolution of marshaling errors.

FIG. 1 illustrates a process for the typical resolution of marshaling errors. An outbound request is made against a client-side stub. The ORB uses marshaling instructions in the client-side stub to serialize parameter data (See step 1 of FIG. 1). The GIOP is a wire-level protocol like FTP or HTTP that describes how data should flow on the wire: what messages look like. It includes the Common Data Representation (CDR), which describes basic formatting for well-known types (integers, longs, etc.), and how to accommodate more complex data types. The ORB marshals serialized parameter data into a well-formed GIOP message and sends the request to the server (See step 2 of FIG. 1). The server-side ORB receives the GIOP message, and retrieves the appropriate "tie" object. The ORB uses instructions in the server-side tie to demarshal the serialized parameter data. In this case, the parameter data cannot be demarshaled based on what the tie knows about the expected parameters—usually because a field or method has been changed on one side but not the other (See step 3 of FIG. 1). The server makes a "meta" callback to the client-side ORB to fetch information about the parameter values it couldn't demarshal (See step 4 of FIG. 1). After receiving the response, the ORB tries to demarshal the parameter data again. If the data is correctly demarshaled, the method on the actual object is invoked, if not, a marshaling exception is generated ("thrown" or "raised" are also words that might be found to express this same idea in the context of some object oriented languages; see step 5 of FIG. 1). The response (either real data or the marshalling exception) is returned to the client. This process is subject to the same marshalling errors as in step 3, and may also require a callback as in step 4 (See step 6 of FIG. 1).

Figure 2:
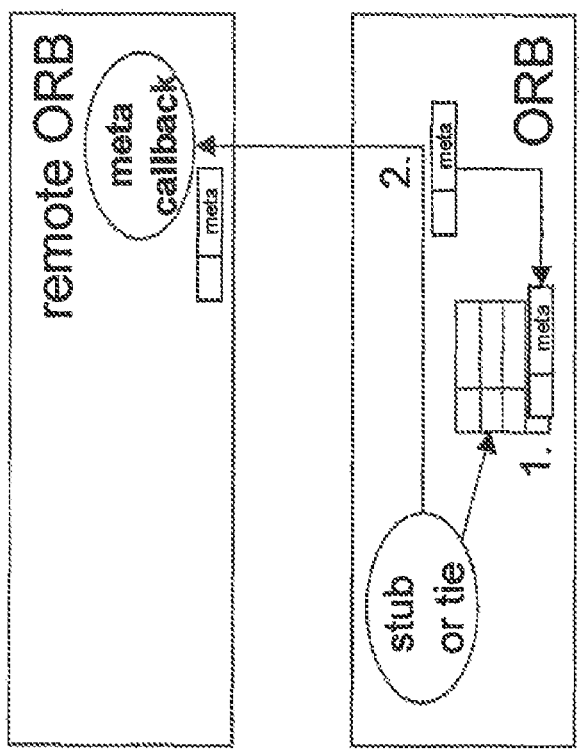
FIG. 2 is a block diagram illustrating the fact that a meta data callback, as an entirely separate outbound method call, is expensive.

As illustrated in FIG. 2, a meta-data callback, as an entirely separate outbound method call, can be expensive. The result is stored in memory by the calling ORB.

There are two aspects of the present invention. It begins with the use of the tool proposed herein which pre-populates a local cache with FVD information for value types marshaled by customer applications. The customer/user feeds available object implementations into a tool, which generates a table containing the FVD information for each version. This is a static process which is performed at any convenient time before its use.

Figure 3:
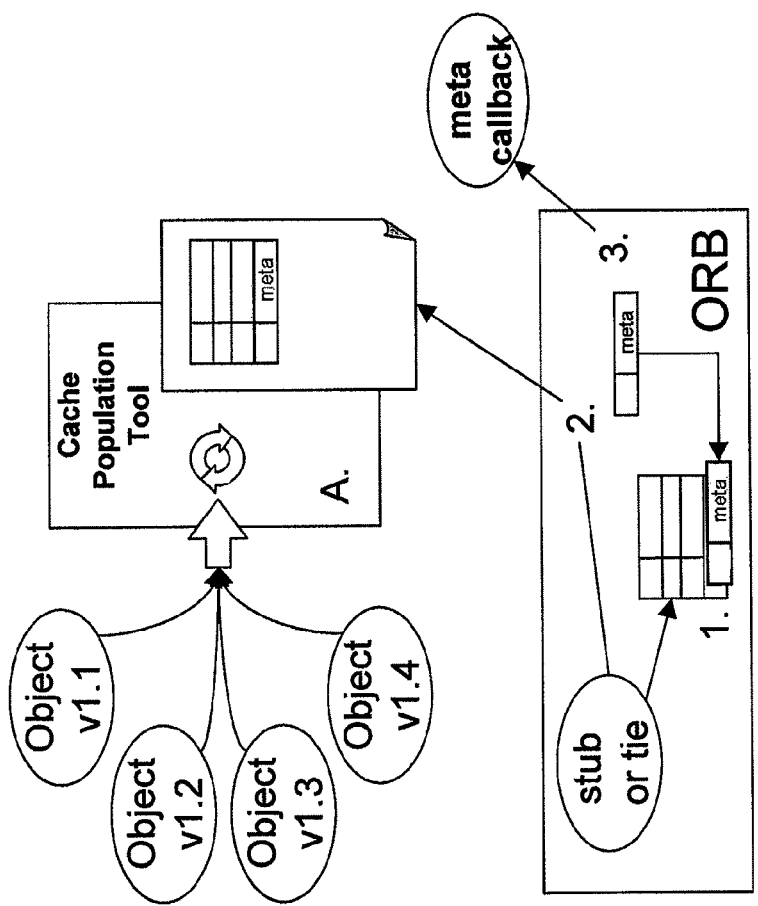
FIG. 3 illustrates the use of a tool to pre-populate the local cache with FVD information for value types marshaled by customer applications in accordance with the present invention.

When a marshalling error occurs (See step 1 of FIG. 3), the local cache is checked (using the repository ID, which is the implementation key sent as part of the marshaled value) to see if the meta data has already been retrieved for that version of the object. If the data is not already in the cache, the tool-generated table is checked. If the information is found in the table, it is added to the local cache, and used to demarshal the parameters (See step 2 of FIG. 3). If the information is not found, behavior reverts to the original callback mechanism (See step 3 of FIG. 3).

The solution provided by the present invention confers several advantages over the well known and widely used solution described above:

1. The client address need not be routable from the server (clients are often on private subnets whose addresses do not make sense outside those subnets).
2. The client address need not be reachable from the server (whether it is routable or not, clients often reside on the other side of a firewall, preventing direct access).
3. The client need not open ports for the server to connect to (this is prohibited by some client environments—for example, web applets);
4. Less data is transmitted, thus speeding up communications; and
5. Tighter control of client software can be enforced—only metadata from permitted client levels is cached on the server.

The invention is now described as it works in a server program. However, it is not limited to servers nor even to a client-server architecture. The invention is equally applicable to a client, or to a peer in a peer-to-peer system.

Typically, the server has at least one implementation of any object that is passed by value. If there are other implementations of that same object in use, the format of the transmitted data may vary. The server needs to know the transmitted format if it is to correctly interpret the data and to instantiate its own implementation. The present invention employs the transmission format of an implementation of an object to be recorded (for example, into a file), and kept with server configuration data.

There are certain things that the present invention employs in carrying out its intended process. For example, the invention assumes that there is present a method for determining that the transmission format of an implemented object is available; this is currently done during operation. In CORBA, the exchange of such data is carefully specified. This method is not part of this invention, but is used by it. This is referred to as the analysis of the implementation, and the product of the analysis is referred to as the implementation descriptor.

A key is also employed (usually a text string) according to which implementations are referenced. Communicating processes currently use this key to refer to parallel implementations uniquely. It is transmitted as part of the data and is used by the receiving process in order for that process to determine whether it can interpret that data. The key is referred to as the implementation key or repository ID. This key is easily determined from the implementation. A property of this key is that if two implementations share the same key, they must share the same transmission format and therefore the same descriptor (typically the two implementations are identical, but this is a stricter condition than required).

In accordance with one embodiment of the present invention, in a first step, all available object implementations in the client software are subjected to analysis. Implementation descriptors are captured, and stored in a table on disk. This table is indexed by an implementation key. This is a static process and is performed independently of the running server or client programs. This step is repeated, as desired, for all versions of client software that are expected to communicate with the server.

Implementation keys may be duplicated across the tables produced. This does not matter since the implementation descriptors are also the same. The tables may be merged and duplicate entries removed. The resulting tables are made available to the server program.

When the server receives an object from a client, it examines the object's implementation key. The server searches its in-memory cache for the implementation descriptor. If the implementation descriptor is not available in the cache, the server searches tables on disk. On finding the implementation descriptor, the server stores it in its cache. The next time it is looked up, it is available in the cache, and no disk search is required.

If no implementation descriptor is found in the cache or on disk, the implementation key is said to be unknown. The server then falls back to the existing method of requesting the implementation descriptor from the client. Alternatively, it may refuse to process the communication. This is a choice made by the server administrator. The present invention allows either behavior to be specified.

If an unknown implementation key is received repeatedly, this represents a failing communication. The table on disk is searched each time, so that new client metadata can be inserted while the server is running.

The maintenance of value-type versions across a large distributed network is now described. Making an (albeit compatible) change to the value-type used by either side of the connection creates this callback situation. With the tool and with the approach described in the present invention, it is possible to create and update a table of meta data containing information about all known versions of an application. A rollout of an application change proceeds in the following general fashion:

1. A new object implementation (with an additional field added, for example) is fed into the tool and added to a meta data table.
2. This updated table is packaged with the application update (for clients), and is "installed" on the server(s) in advance of any client updates.
3. As clients are upgraded, they pick up the updated meta data table, which contains information about any new objects (which they are using) and the old object (which the server is still using). No callbacks are necessary from either side.
4. The server application is upgraded; if there are old clients still remaining, the server knows how to demarshal data they send; if there are reasons not to update the code that that client is running, the meta data table is still useful to avoid callbacks.

The present description refers to data being cached and also refers to cache memory operations. This is not intended to refer to a hardware cache; rather it is generally intended to refer to that memory in a data processing system that is available (active) without the need to access a slower memory as measured in access time. Such slower memories are typically rotating, magnetic disks and their drive mechanisms. More generically, these memories, while being slower, are also nonvolatile. Additionally, it is noted that there is no intended difference amongst the terms "metadata," "meta data" and "meta-data." Additionally, it is noted that there also is no intended difference amongst the terms "callback," "call back" and "call-back."

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for processing a marshaled object sent to a data processing receiver of a data processing system, said method comprising:

prior to receiving across a network by the data processing receiver of the data processing system a sent marshaled object, statically analyzing object implementations within the data processing system and capturing and accumulating a plurality of marshalling implementation version descriptors for subsequent use in de-marshalling objects, each marshalling implementation version descriptor comprising version based runtime marshalling metadata which facilitates the marshalling of a respective marshaled object;

pre-populating a plurality of non-volatile memory tables with the plurality of marshalling implementation version descriptors used within the data processing system, the plurality of pre-populated non-volatile memory tables being stored in non-volatile memory and persistently holding the plurality of marshalling implementation version descriptors;

subsequent to the pre-populating, receiving across the network by the data processing receiver of the data processing system the sent marshaled object;

examining a marshalling implementation version key sent with the marshaled object;

initially searching memory in the data processing receiver for a respective marshalling implementation version descriptor identified by the marshalling implementation version key sent with the marshaled object, the respective marshalling implementation version descriptor comprising version-based runtime marshalling metadata which facilitates de-marshalling of the received marshaled object, the memory of the data receiver being separate from the non-volatile memory in which the plurality of pre-populated non-volatile memory tables are stored;

in response to the respective marshalling implementation version descriptor being unavailable in the memory, searching by the data processing receiver, the pre-populated non-volatile memory tables comprising the plurality of marshalling implementation version descriptors used within the data processing system for the respective marshalling implementation version descriptor, the plurality of marshalling implementation version descriptors having been pre-populated in the pre-populated non-volatile memory tables prior to the receiving the marshaled object; and upon ascertaining the respective marshalling implementation version descriptor within the pre-populated non-volatile memory tables, de-marshalling the sent marshaled object using the ascertained marshalling implementation version descriptor, wherein the de-marshalling occurs absent a call-back operation to a sender of the sent marshaled object for the respective marshalling implementation version descriptor notwithstanding initial unavailability of the respective marshalling implementation version descriptor in the memory of the data processing receiver, the de-marshalling performed based on searching the plurality of marshalling implementation version descriptors in the pre-populated, non-volatile memory tables thereby decreasing traffic across the network across which the data processing receiver received the sent marshaled object.

2. The method of claim 1 further including sending the sent marshaled object and the marshalling version implementation key.

3. The method of claim 1 in which said memory is active memory.

4. The method of claim 1 in which said non-volatile memory is a magnetic disk memory.

5. The method of claim 1 further including establishing the pre-populated non-volatile memory tables in said non-volatile memory in which, in the pre-populated non-volatile memory tables, the marshalling implementation version key is associated with the marshalling implementation version descriptor.

6. The method of claim 5 in which said establishing is repeated over time, whereby new marshalling implementation version descriptors of objects are incorporated into the pre-populated non-volatile memory tables.

7. The method of claim 1 further including responsive to the respective marshalling implementation version descriptor being unavailable in the pre-populated non-volatile memory tables comprising the plurality of marshalling implementation version descriptors used within the data processing system, initiating a call-back operation to a sender of the marshaled object and obtaining the respective marshalling implementation version descriptor as a result of the call-back operation.

8. The method of claim 7 in which the respective marshalling implementation version descriptor obtained as a result of the call back operation is obtained over a different connection.

9. The method of claim 8 in which the different connection includes a firewall.

10. The method of claim 1 further including instantiating the object.

11. The method of claim 1 in which said non-volatile memory exhibits slower access than the memory in said receiver.

12. The method of claim 1 in which only marshalling implementation version descriptor metadata from permitted client levels is present in said memory.

13. A data processing system comprising:
a data processing receiver comprising a memory and a processor in communications with the memory, wherein the data processing system is configured to perform a method of processing a marshaled object sent to the data processing receiver, the method comprising:
prior to receiving across a network by the data processing receiver of the data processing system a sent marshaled object, statically analyzing object implementations within the data processing system and capturing and accumulating a plurality of marshalling implementation version descriptors for subsequent use in de-marshalling objects, each marshalling implementation version descriptor comprising version based runtime marshalling metadata which facilitates de-marshalling of a respective marshaled object;
pre-populating a plurality of non-volatile memory tables with the plurality of marshalling implementation version descriptors used within the data processing system, the plurality of pre-populated non-volatile memory tables being stored in non-volatile memory and persistently holding the plurality of marshalling implementation version descriptors;
subsequent to the pre-populating, receiving across the network by the data processing receiver of the data processing system the sent marshaled object;
examining a marshalling implementation version key sent with the marshaled object;
initially searching the memory in the data processing receiver for a respective marshalling implementation version descriptor identified by the marshalling implementation version key sent with the marshaled object, the respective marshalling implementation version descriptor comprising version-based runtime marshalling metadata which facilitates de-marshalling of the received marshaled object, the memory of the data receiver being separate from the non-volatile memory in which the plurality of pre-populated non-volatile memory tables are stored;
in response to the respective marshalling implementation version descriptor being unavailable in the memory, searching by the data processing receiver, the pre-populated non-volatile memory tables comprising the plurality of marshalling implementation version descriptors used within the data processing system for the respective marshalling implementation version descriptor, the plurality of marshalling implementation version descriptors having been pre-populated in the pre-populated non-volatile memory tables prior to the receiving the marshaled object; and
upon ascertaining the respective marshalling implementation version descriptor within the pre-populated non-volatile memory tables, de-marshalling the sent marshaled object using the ascertained marshalling implementation version descriptor, wherein the de-marshalling occurs absent a call-back operation to a sender of the sent marshaled object for the respective marshalling implementation version descriptor notwithstanding initial unavailability of the respective marshalling implementation version descriptor in the memory of the data processing receiver, the de-marshalling performed based on searching the plurality of marshalling implementation version descriptors in the pre-populated, non-volatile memory tables thereby decreasing traffic across the network across which the data processing receiver received the sent marshaled object.

14. The computer system of claim 13, wherein the memory is an active cache memory.

15. The computer system of claim 13, wherein the pre-populated non-volatile memory tables reside in a magnetic disk memory.

16. The computer system of claim 13, further comprising establishing the pre-populated non-volatile memory tables in non-volatile memory, within which the marshalling implementation version key is associated with the marshalling implementation version descriptor.

17. The computer system of claim 13, further comprising, in response to the respective marshalling implementation version descriptor being unavailable in the pre-populated non-volatile memory tables comprising the plurality of marshalling implementation version descriptors used within the data processing system, initiating a call-back operation to a sender of the marshaled object and obtaining the respective marshalling implantation version descriptor as a result of the call-back operation.

18. The computer system of claim 17, wherein the respective implementation version descriptor obtained as a result of the call-back operation is obtained over a different connection than the marshaled object.

19. The computer system of claim 18, wherein the different connection includes a firewall.

20. The computer system of claim 13, in which all marshalling implementation version descriptors permitted within the data processing system are included within the pre-populated non-volatile memory tables.

* * * * *